(12) United States Patent
Borkgren

(10) Patent No.: US 8,622,192 B2
(45) Date of Patent: Jan. 7, 2014

(54) CONVEYOR SHIFT ASSEMBLY AND PRODUCT CART WITH CONVEYOR SHIFT ASSEMBLY

(75) Inventor: Stanley R. Borkgren, Geneseo, IL (US)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 13/306,468

(22) Filed: Nov. 29, 2011

(65) Prior Publication Data
US 2013/0134013 A1    May 30, 2013

(51) Int. Cl.
*B65G 41/00*    (2006.01)

(52) U.S. Cl.
USPC ............................. 198/312; 198/318; 198/317

(58) Field of Classification Search
USPC ........................................ 198/312
See application file for complete search history.

(56) References Cited

U.S. PATENT DOCUMENTS

| | | | |
|---|---|---|---|
| 5,178,253 A * | 1/1993 | Fix | 198/317 |
| 5,913,369 A * | 6/1999 | Bodie et al. | 172/311 |
| 6,910,586 B2 * | 6/2005 | McCloskey | 209/241 |
| 7,267,519 B2 | 9/2007 | Cresswell et al. | |
| 7,488,149 B2 * | 2/2009 | Waldner | 414/532 |
| 7,500,814 B2 * | 3/2009 | Meyer | 414/327 |
| 7,740,189 B2 * | 6/2010 | Meyer et al. | 239/159 |
| 8,408,377 B2 * | 4/2013 | Werlinger | 198/313 |

* cited by examiner

*Primary Examiner* — Ramya Burgess
*Assistant Examiner* — Thomas Randazzo (57) ABSTRACT

A product cart has a frame and one or more tanks forming compartments each having an opening at the upper end for receiving product. The cart includes a conveyor support having a swing arm with a first end pivotally mounted to the frame for motion generally horizontally between storage and use positions, a shift assembly mounted to a second end of the swing arm, and a mounting bracket assembly coupled to the shift assembly. Finally a conveyor is coupled to the mounting bracket assembly. The swing arm is constructed as a parallel linkage having first and second links which form a four-bar parallel linkage with the frame and with the shift assembly to maintain the shift assembly in a fixed orientation relative to the frame as the swing arm is moved. The shift assembly is operable to move the mounting bracket assembly between lowered and raised positions.

11 Claims, 11 Drawing Sheets

CONVEYOR SHIFT ASSEMBLY AND PRODUCT CART WITH CONVEYOR SHIFT ASSEMBLY

FIELD

A product cart is disclosed together with a conveyor support for mounting a conveyor to the cart for use in filling and emptying the cart. The cart can take any of a variety of forms, including an air cart of an air seeder.

BACKGROUND AND SUMMARY OF THE DISCLOSURE

A product cart is disclosed having a frame and one or more tanks forming a plurality of compartments each having an opening at the upper end thereof for receiving product into the compartments. The cart further includes a conveyor support having a swing arm with a first end pivotally mounted to the frame for motion generally horizontally between a storage position and a use position, a shift assembly mounted to a second end of the swing arm, and a mounting bracket assembly coupled to the shift assembly. Finally a conveyor is coupled to the mounting bracket assembly. The swing arm is constructed as a parallel linkage having first and second links which together with a frame and with the shift assembly form a four-bar parallel linkage to maintain the shift assembly in a fixed orientation relative to the frame as the swing arm is moved. The shift assembly is operable to move the mounting bracket assembly between lowered and raised positions.

The conveyor support is described as having a swing arm with a first end adapted to be pivotally mounted to a frame for motion between a conveyor storage position and a conveyor use position, a shift assembly mounted to a second end of the swing arm and a mounting bracket assembly coupled to the shift assembly and adapted to be coupled to a conveyor housing. The swing arm is constructed as a parallel linkage having first and second links which together with a frame and with the shift assembly form a four-bar parallel linkage to maintain the shift assembly in a fixed orientation relative to the frame as the swing arm is moved. The shift assembly is operable to move the mounting bracket between lowered and raised positions.

The shift assembly and mounting bracket assembly for a conveyor are described as having an attachment bracket that mounts the shift assembly to a support and forms a ground link of a four-bar linkage. A parallel linkage having first and second parallel links each are coupled at a first end to the attachment bracket while a coupler is connected to the other end of each of the first and second links such that the coupler maintains a fixed attitude relative to the attachment bracket as the first and second links are moved. The mounting bracket assembly is connected to the coupler and is adapted to mount a conveyor thereto. The parallel linkage of the shift assembly is movable in a generally vertical plane so that the mounting bracket assembly is moved between a lowered position and a raised position.

DETAILED DESCRIPTION

Figure 1:
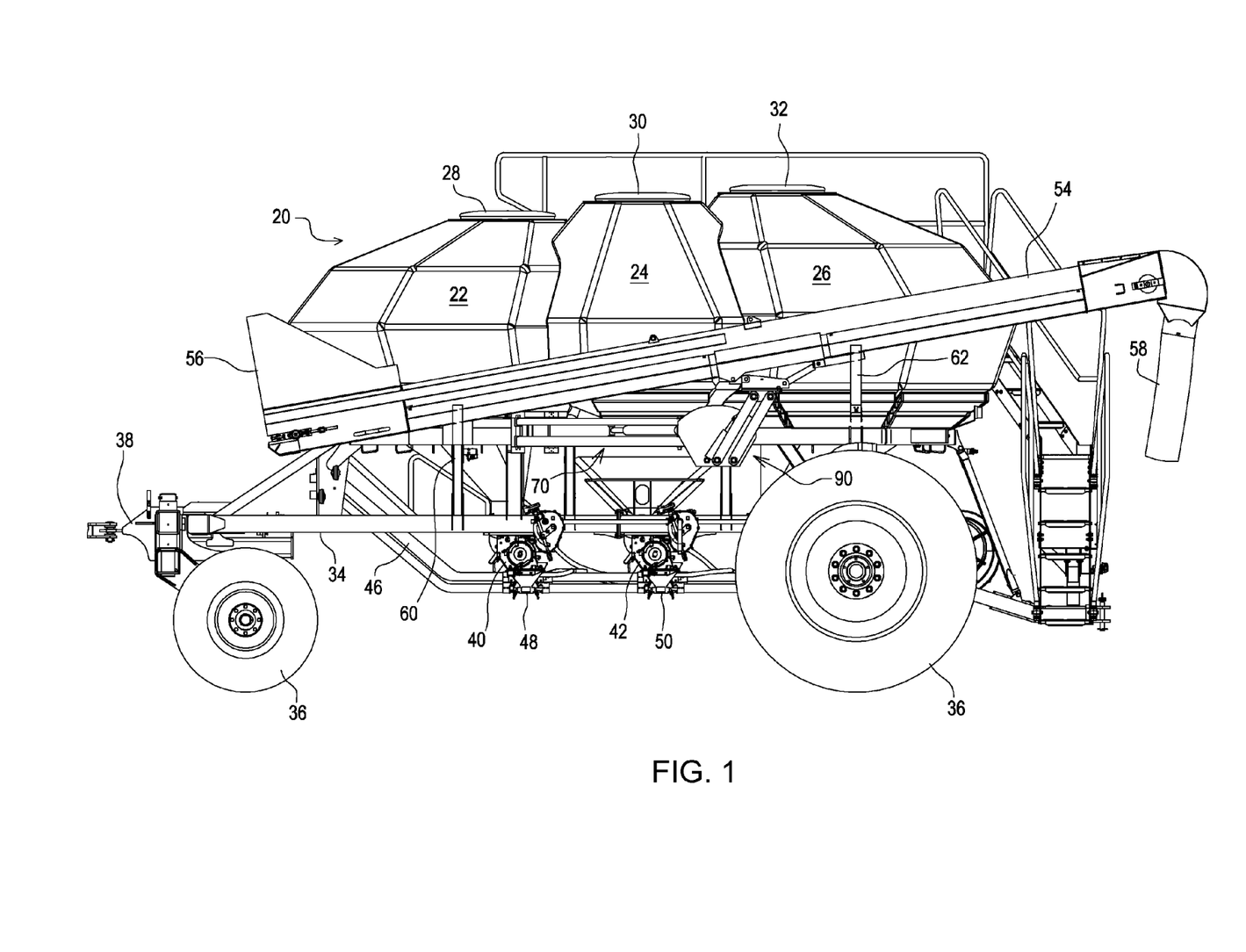
FIG. 1 is a side view of a product cart having a conveyor support as described herein.
Figure 2:
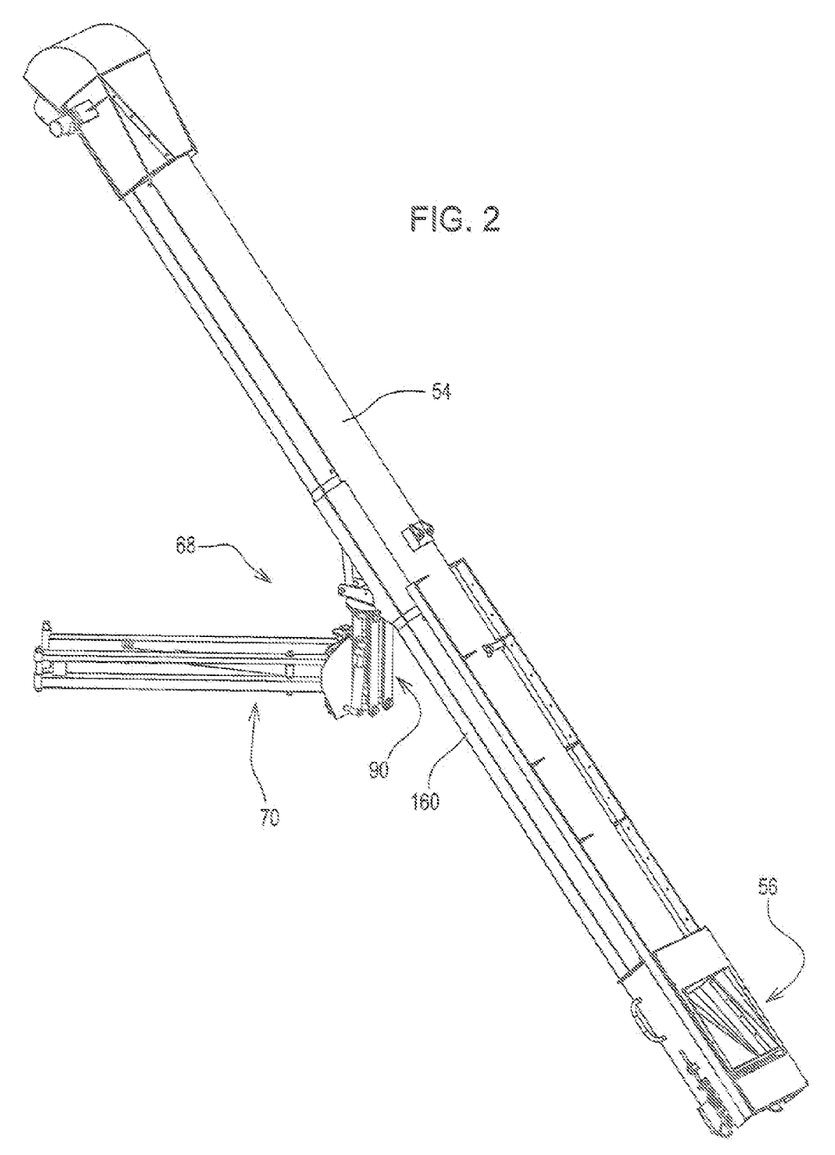
FIG. 2 is a perspective view of the conveyor support and conveyor of the cart shown in FIG. 1.
Figure 3:
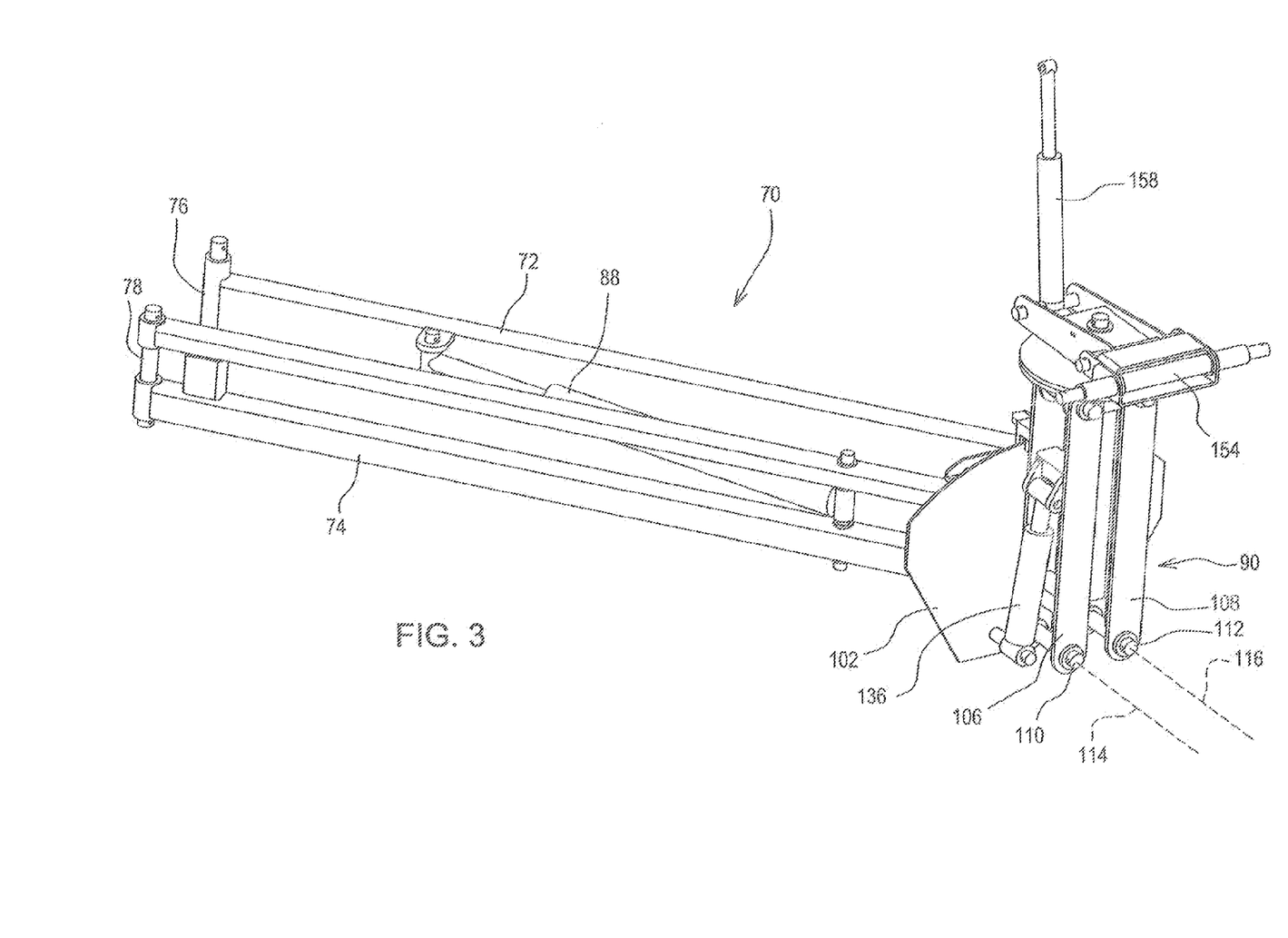
FIGS. 3 and 4 are enlarged perspective views of the conveyor support in the cart shown in FIG. 1.
Figure 4:
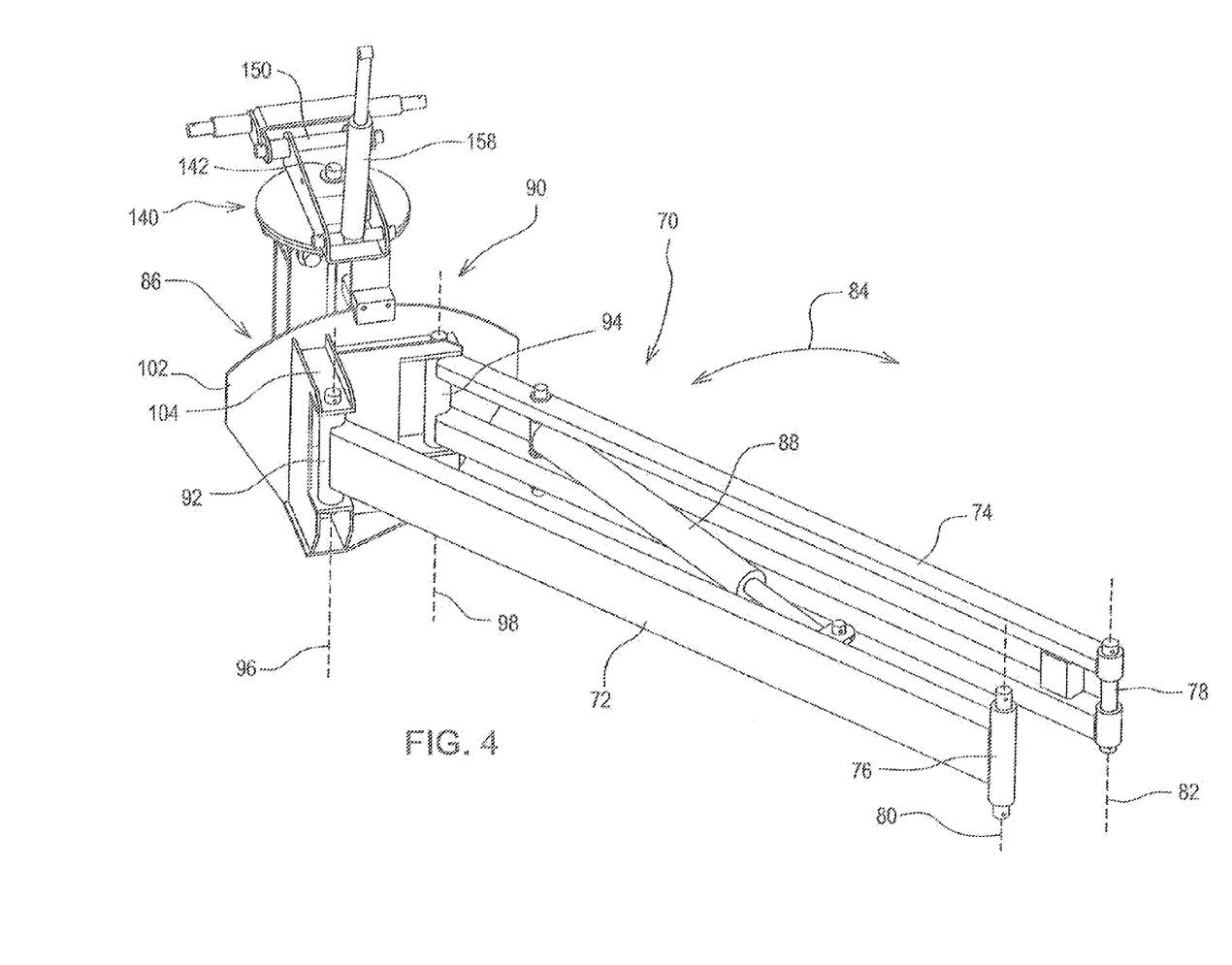

A product cart 20 is shown in FIG. 1 having product tanks 22, 24 and 26 each forming a compartment for carrying a granular product. The tanks have openings 32, 28 and 30 respectively at their upper ends through which the compartments can be filled with a granular product. The tanks are supported on a frame 34 which in turn is supported by tires 36 for moving the cart. The frame 34 includes a tongue 38 to enable the cart 20 to be connected to a hitch of a towing vehicle, not shown. As shown, cart 20 is an air cart of an air seeder with the compartments intended to hold seed and fertilizer or other chemicals to be applied in the ground. Other carts may be grain carts to carry harvested grain products from a field, fertilizer or other chemical carts, rail cars or any other vehicle used to transport granular material. While the cart 20 shown is a towed cart, a self-propelled cart or truck can be used.

The illustrated cart, being an air cart for seeding has meters 40 and 42 at the lower end of each of the compartments formed by tanks 22 and 24 respectively. Tank 26 likewise has a meter that is not shown in FIG. 1. Product from the compartments is delivered by the meters to pneumatic conduits 46 for delivery of product to a tool, not shown. The meters 40, 42 further have clean out openings 48, 50 respectively through which product from the compartments is drained to empty the compartments.

To facilitate both filling of the compartments and clean out of the compartments, the cart 20 includes a conveyor 54. The conveyor includes a fill hopper 56 at one end and a discharge spout 58 at the other end. The conveyor can be used to fill the compartments with product through the upper openings 28, 30 and 32 by positioning the conveyor in a cart use position in which the discharge spout 58 can be aligned with the desired opening 28, 30 or 32 and then receiving product into the hopper 56 for conveying to the discharge spout. Additionally, the conveyor can be positioned with the hopper beneath one or the other of the clean out openings 48, 50 in a cart clean out position to receive product from the compartments and conveying the product to the discharge spout 58 for delivery into another container. The cart includes front and rear support brackets 60, 62 to hold the conveyor in a storage position in which the conveyor extends parallel to the cart fore and aft direction as shown in FIG. 1.

The conveyor is attached to the cart frame 34 by a conveyor support 68 shown in FIGS. 2-6. Conveyor support 68 includes a swing arm 70 constructed as a parallel linkage having first and second parallel links 72, 74. The links are coupled at first ends thereof to the frame 34 by pivots 76, 78 that define generally vertical axes 80, 82 respectively. The pivots 76, 78 allow the swing arm 70 to move in an arc horizontally as shown by the arrow 84. The first and second links 72, 74 are coupled at second ends thereof to a shift assembly 90. Shift assembly 90 includes an attachment bracket 86 with pivots 92 and 94 connected to the first and second links 72, 74. The pivots allow for rotation about generally vertical axes 96, 98 respectively. The attachment bracket 86 includes a plate 102 and an L-shaped bracket 104 forming the pivots 92, 94. A linear actuator 88 extending between the links 72, 74 moves the linkage and controls the position of the swing arm. Alternatively, the actuator 88 could be coupled at one end to the frame 34 and at the other end to one of the links 72, 74.

The first and second parallel links 72, 74 of the swing arm 70, together with the frame 34 of the cart and the shift assembly, form a four-bar parallel linkage to maintain the shift assembly in a fixed orientation relative to the frame 34 as the swing arm is moved horizontally as shown by the arc 84.

Figure 5:
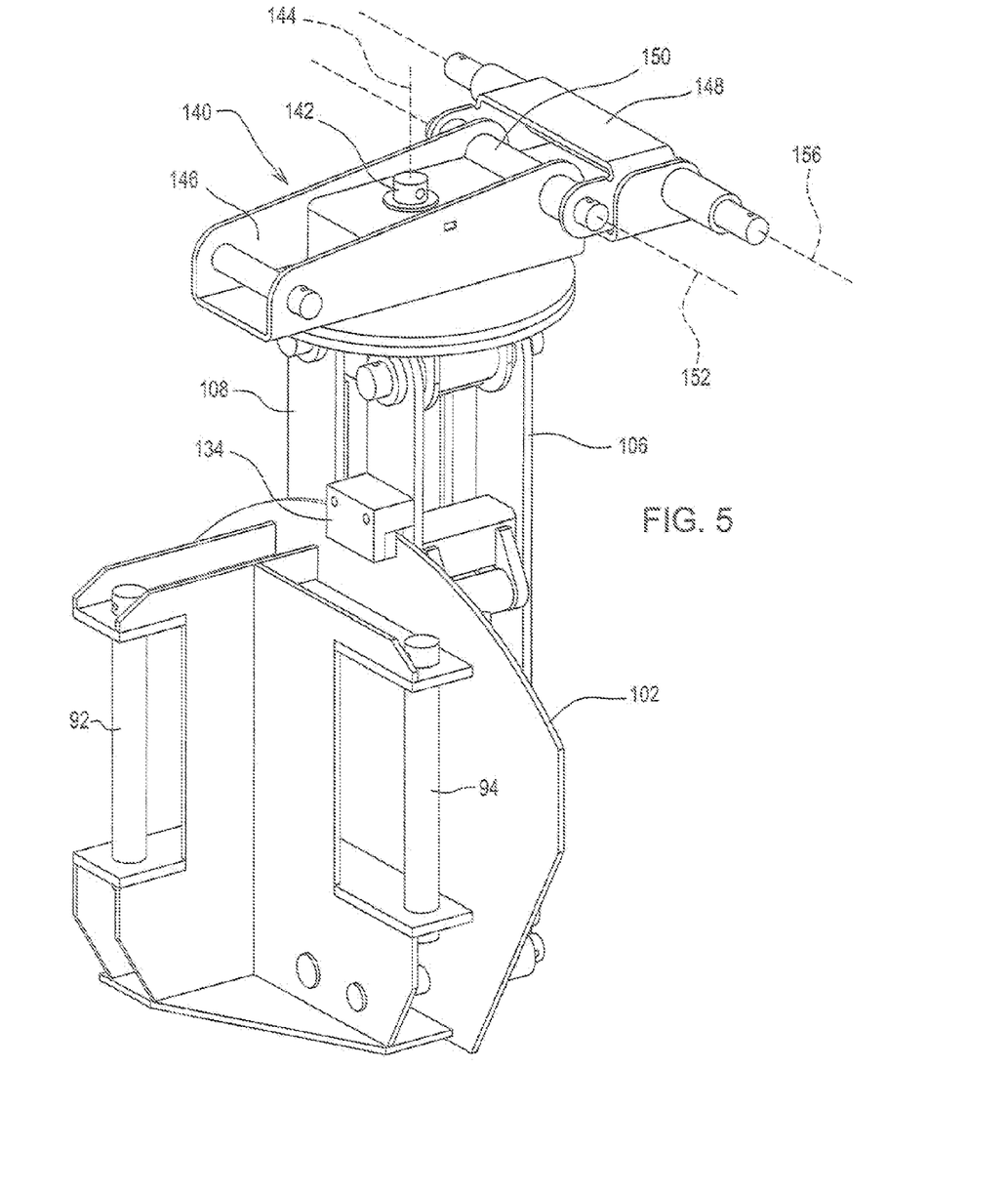
FIGS. 5 and 6 are enlarged perspective views of the shift assembly and mounting bracket assembly of the conveyor support.
Figure 6:
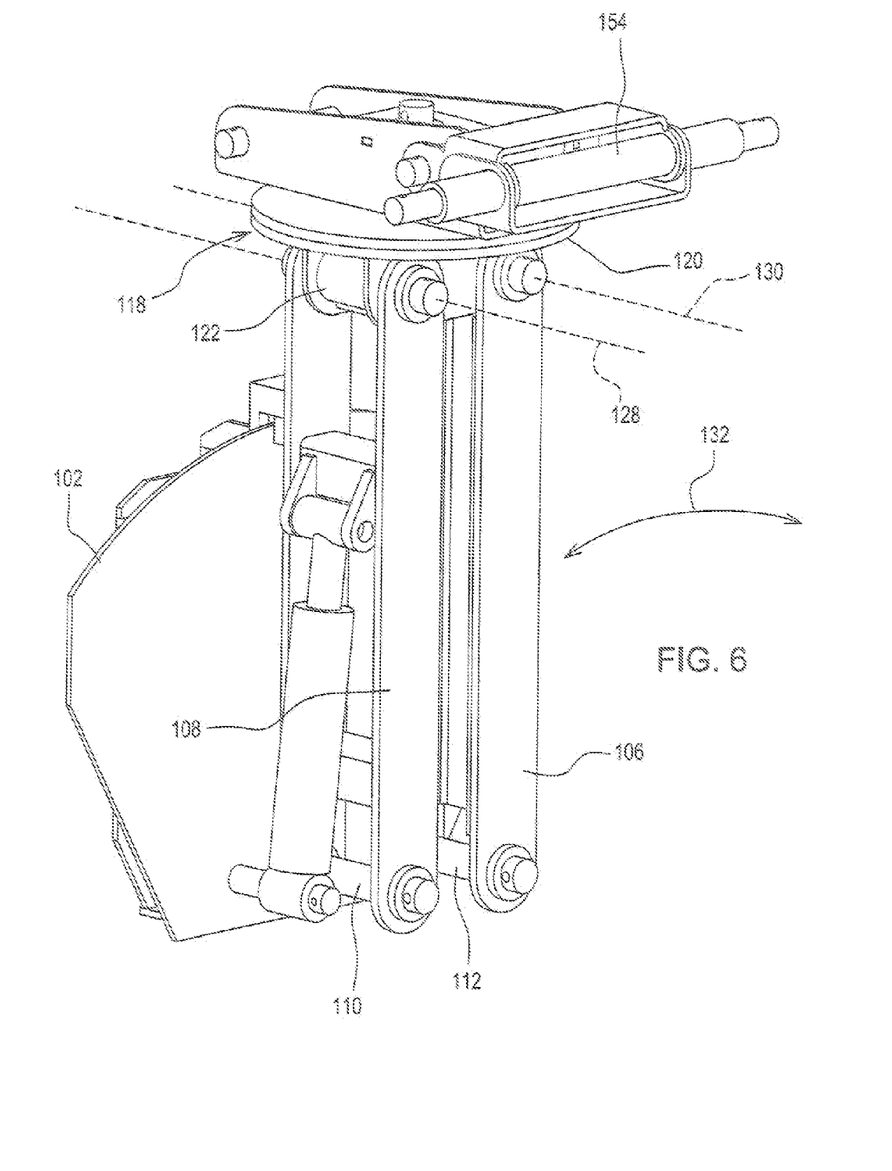

The shift assembly also includes a four-bar parallel linkage. Shift assembly first and second links 106, 108 are pivotally mounted to the plate 102 on the side of the plate opposite the L-shaped bracket 104. The shift assembly links 106, 108 rotate about pivots 110, 112 defining axes 114, 116. The axes 114, 116 are generally horizontal. A coupler 118, in the form of a plate 120 with a bracket 122 on the bottom of the plate 120 is coupled to the other ends of the links 106, 108. Pivots 124 and 126 connect the links to the coupler 118 and define axes 128, 130. The links 106, 108, together with the plate 102 and coupler 118 form a four-bar parallel linkage to maintain the coupler 118 in a fixed attitude relative to the ground as the shift assembly links move. The links 106, 108 move generally in a vertical plane in an arc shown by the arrow 132. A guide 134 carried by the link 106 has a channel that receives the upper edge of the plate 102 to support the links and reduce the bending load on the pivots 110, 112. A shift assembly linear actuator 136 extends between the plate 102 and the first link 106 of the shift assembly to control the position of the linkage.

A mounting bracket assembly 140 is attached to the plate 120 by a pivot 142 that allows the mounting bracket assembly 140 to rotate about a vertical axis 144. The mounting bracket assembly 140 is a hinge like structure having a first member 146 and a second member 148 pinned together at a pivot 150 for rotation about a horizontal pivot axis 152. The first member 146 is held to the plate 120 while the second member is allowed to rotate relative to the first member about the axis 152. The mounting bracket assembly 140 is used to mount the conveyor 54 onto the conveyor support 68. The housing 160 of the conveyor is rotatably coupled to the pivot 154 of the mounting bracket assembly second member 148 and defines an axis 156. A linear actuator 158 extends from the mounting bracket assembly 140 to the conveyor housing, spaced from the pivot 154 to control the inclination of the conveyor.

Figure 7:
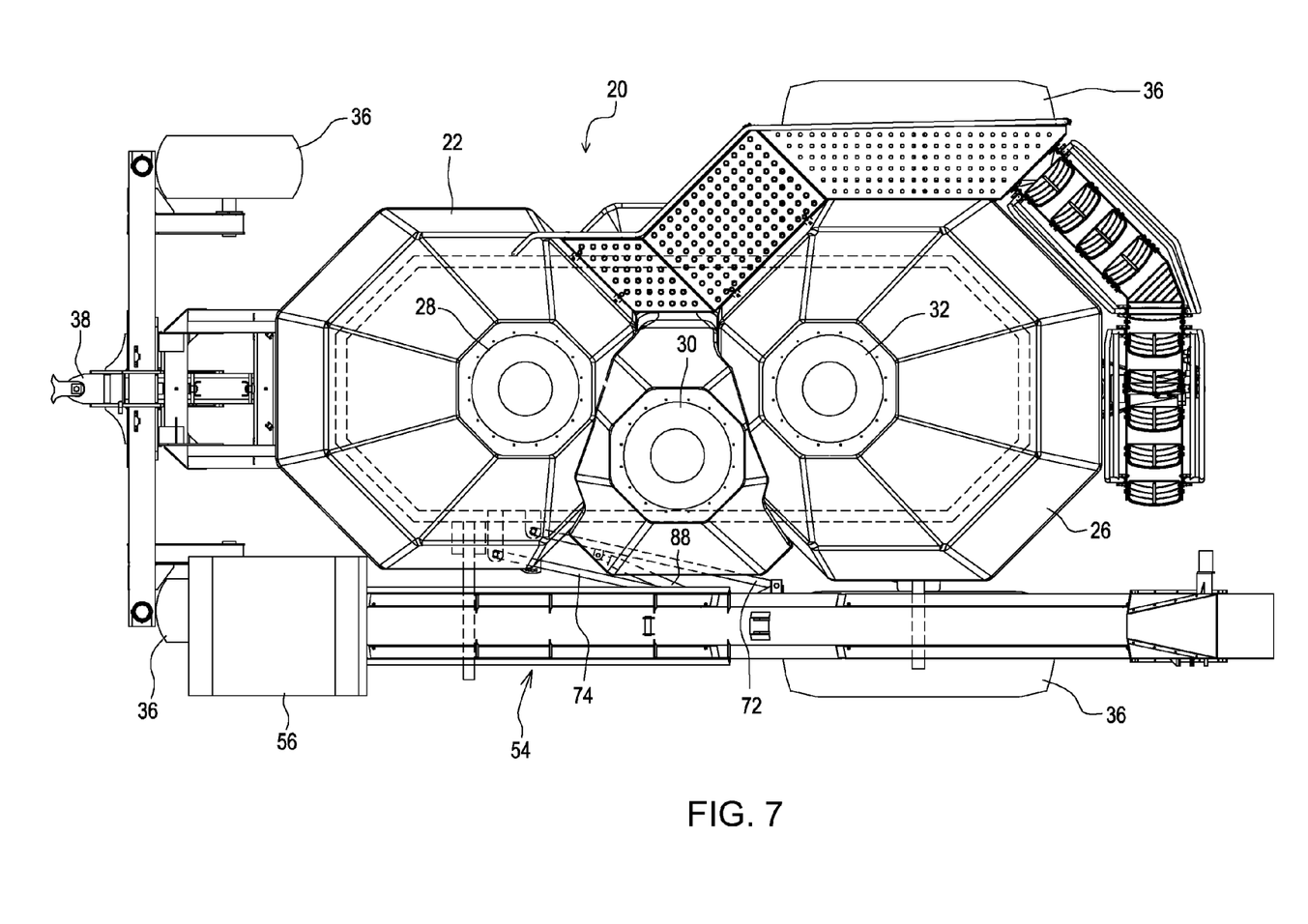
FIG. 7 is a plan view of the cart of FIG. 1 illustrating the conveyor in the storage position.
Figure 8:
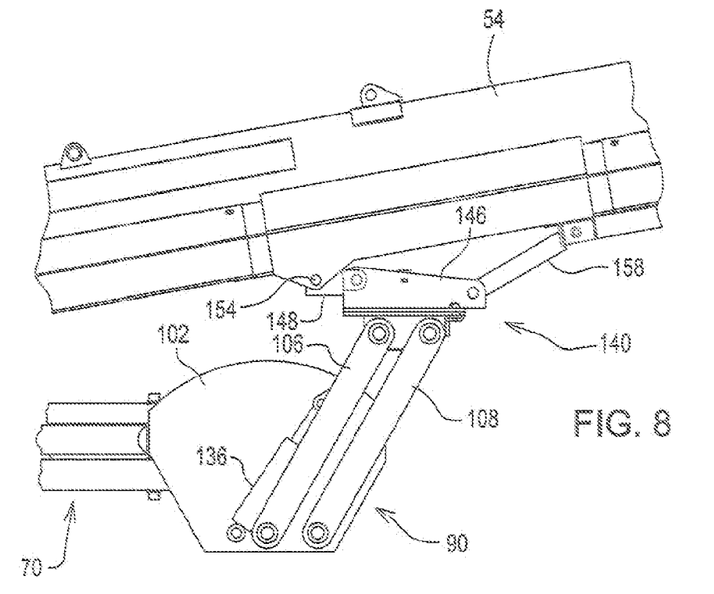
FIG. 8 is a side view of the conveyor support shift assembly with the conveyor in the storage position.
Figure 9:
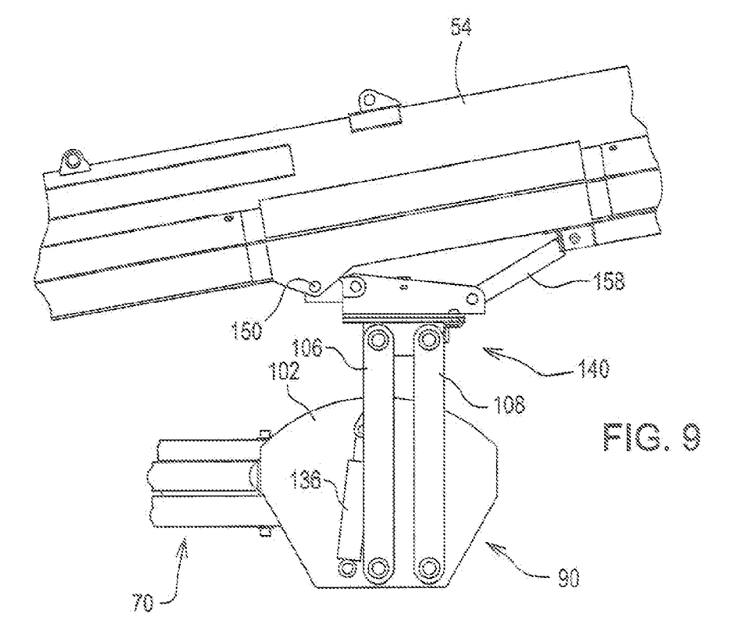
FIG. 9 is a side view of the conveyor shift assembly like FIG. 8 with the shift assembly in a raised center position.

FIG. 7 shows a top view of the cart 20 with the conveyor 54 in a storage position. The swing arm 68 is generally parallel to the fore and aft direction of the cart as is the conveyor 54. In the storage position, the shift assembly 90 is shifted to the rear of the cart with the links 106, 108 extending upward and rearward at about the 2 o'clock position as shown in FIG. 8. The first movement of the conveyor support 68 in deploying the conveyor to a use position is moving the shift assembly by rotating the links 106, 108 counter clockwise to a more upward position as shown in FIG. 9. This raises the conveyor off the front and rear support brackets 60 and 62 while moving the conveyor forward slightly. Due to the four-bar parallel linkage of the shift assembly, the attitude, that is the angle of inclination of the conveyor, remains the same during this movement. The linear actuator 158 is not actuated during this movement of the shift assembly.

Figure 10:
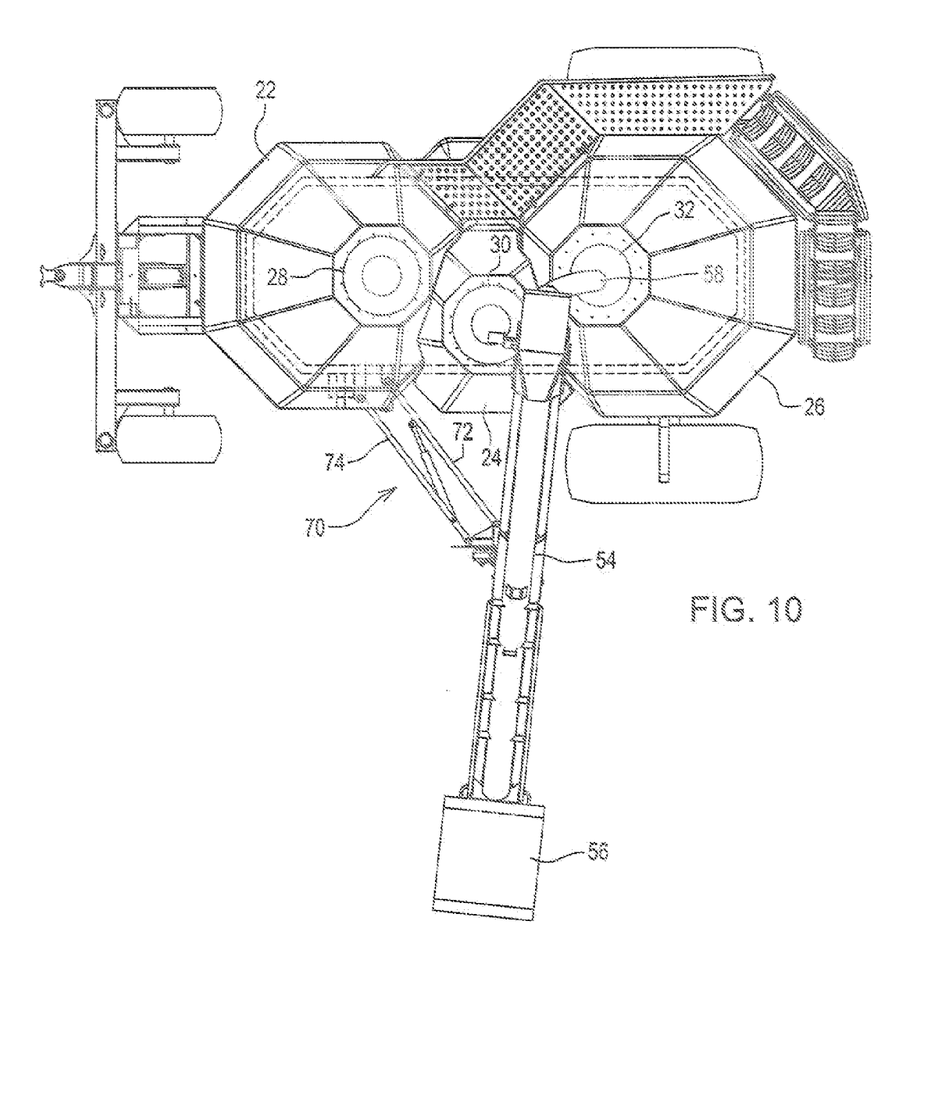
FIG. 10 is a plan view of the cart like FIG. 7 with the conveyor in a conveyor use position to fill one or more compartments of the cart.

Deployment of the conveyor continues with pivoting of the swing arm 70 from the fore and aft extending position shown in FIG. 7 to a laterally projecting position shown in FIG. 10. The swing arm pivots by operation of the actuator 88. The deployed use position of the swing arm can be any position in the pivot range of the swing arm. In the embodiment shown, the swing arm has more than 135 degrees of travel. Any position within that range can be a "conveyor use position" of the swing arm. While actuating the linear actuator 88, the shift assembly, and therefore the conveyor, maintains a fore and aft extending orientation relative to the cart 20. Once the swing arm is pivoted to the desired conveyor use position, the conveyor is rotated about the axis 144 by manual manipulation. Alternatively, the conveyor can be rotated about the axis 144 as the swing arm is pivoted outwardly. The linear actuator 158 is also extended to raise the discharge spout end of the conveyor and lower the hopper 56 to the ground. The shift assembly may also be moved slightly rearwardly by rotation along the arc 132. In a first conveyor use position, the upper end of the conveyor is located where the discharge spout 58 can be placed in each the openings 30 and 32 of the two rearmost compartments of the cart. This position corresponds to a rearward position of the shift assembly.

Figures 11, 12:
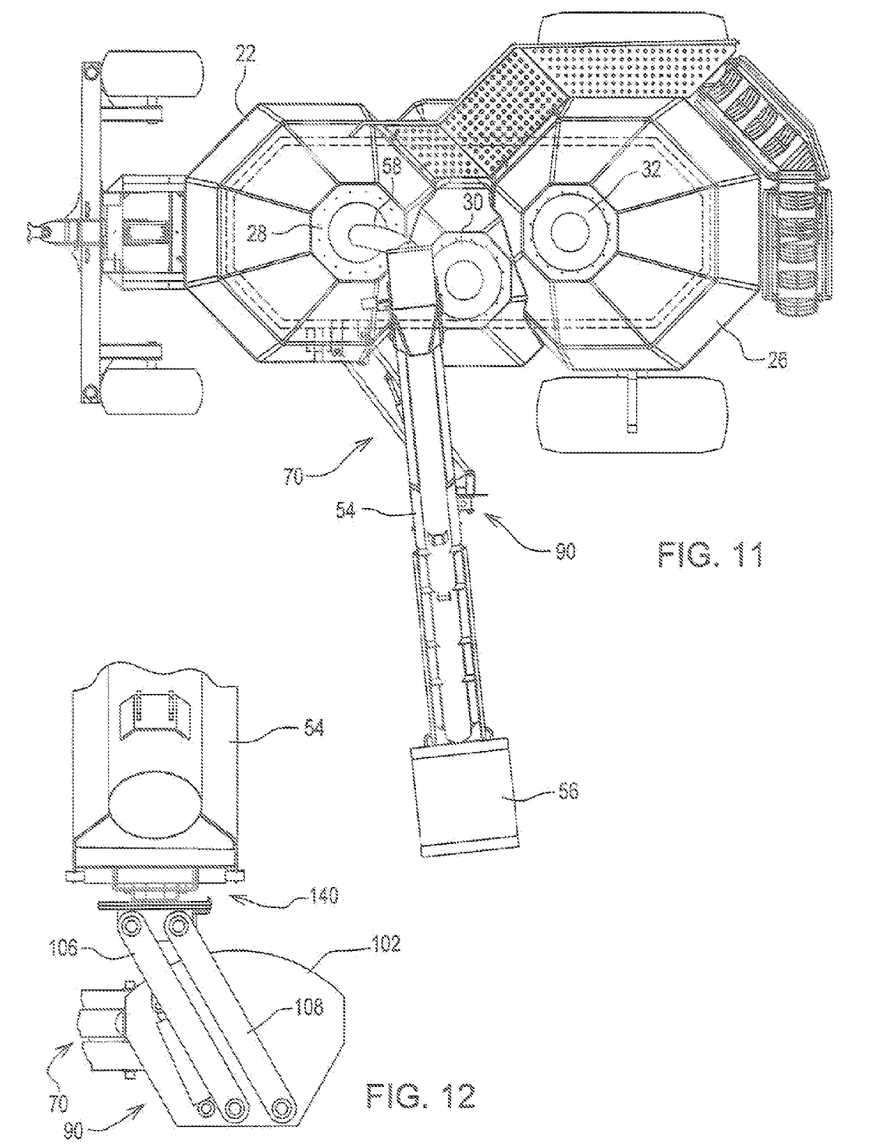
FIG. 11 is a plan view of the cart like FIG. 10 with the conveyor in another use position.
FIG. 12 is a side view of the shift assembly in a forward shifted position corresponding to the conveyer fill position shown in FIG. 11.

The conveyor is moved to a second tank fill position by actuating the shift assembly to move to a forward position shown in FIG. 12 while the hopper 56 remains in position shown in FIG. 10. This moves the upper end of the conveyor forward to a position shown in FIG. 11 where the discharge spout can be placed in each of the openings 28 and 30 of the two forward most compartments. It will be appreciated by those in the art that different tank configurations, including more or less than three tanks can be used with appropriate changes to the geometry of the shift assembly and/or swing arm. As one example, a cart having five tanks can use the conveyor support 68 with one conveyor fill position used to fill the rear two compartments with the shift assembly in a rearward position, another conveyor fill position to fill the center compartment with the shift assembly in a center upright position and third conveyor fill position to fill the front two compartments with the shift assembly in the forward position.

Figure 13:
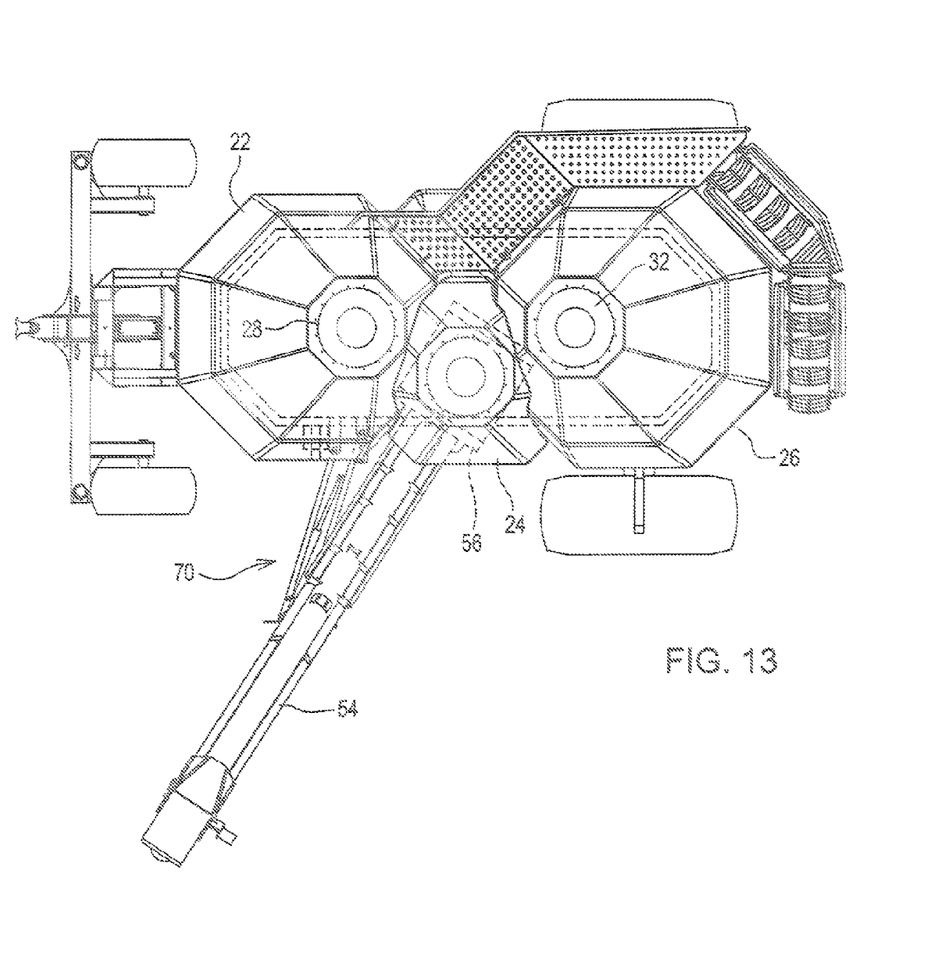
FIG. 13 is a plan view of the cart like FIG. 7 illustrating the conveyor in a use position to clean out a compartment of the cart.

The conveyor 54 is also used to empty the compartments after use. This is accomplished by moving the swing arm 70 and shift assembly 90 as needed to place the hopper 56 beneath the clean out opening of each compartment. In FIG. 13, the conveyor is positioned with the hopper 56 beneath the clean out opening 48 of the forward most compartment.

As shown, the swing arm 70 has multiple conveyor use positions. Similarly, the shift assembly 90 has multiple use positions as well. The swing arm moves the conveyor 54 away from and toward the cart and also moves the conveyor fore and aft relative to the cart. The shift assembly moves the conveyor up and down and fore and aft. Furthermore, with the conveyor fill hopper on the ground, the shift assembly moves the discharge hopper end of the conveyor fore and aft to reach different compartments for filling. The mounting bracket assembly together with the linear actuator 158 controls the inclination of the conveyor. Pivot 142 adjusts the angle of the conveyor relative to the cart and is manually adjustable; however, a rotational drive can be added if desired.

As noted above, the cart can have any number of compartments with the size of the conveyor and length of the conveyor support varied as necessary to reach each compartment. The illustrated cart has individual tanks each forming a compartment. Alternatively, a single tank can be divided internally into multiple compartments. In the cart 20 as illustrated, the tanks 22, 24, 26 are shown supported by a separate frame 34. Alternatively, the tank or tanks can be constructed as a structural member not in need of a separate frame. With this in mind, the claims that follow are not to be understood as requiring a separate frame structure from the tank or tanks. The various linear actuators are shown as being hydraulic cylinders. However, they could be other types of actuators including electronic actuators. They need not be linear but could be rotary actuators couple to a pivot about which a driven component is rotated.

Various axes are described as being horizontal or vertical and movements of components in the conveyor support are described as being horizontal or vertical. In an alternative arrangement, the pivots need not be horizontal or vertical but could be inclined. For example, the pivots 76, 78 attaching the swing arm 70 to the frame 34 may be inclined to the vertical such that as the swing arm pivots from a storage position to a use position, the swing arm moves forwardly and upwardly. Other arrangements are also possible. Unless specifically noted in the following claims, the orientation of the pivot axes should not be limited to the embodiment shown and described.

While the swing arm 70 and shift assembly 90 are shown together in a single conveyor support 68, they can each be used separately. In other words, the swing arm 70 can be used without the shift assembly 90 and the shift assembly 90 can be used without the swing arm 70.

The conveyor support shown and described provides efficient and complete control over the movement of the conveyor for both filling the tanks and emptying the tanks.

Having described the product cart and conveyor support, it will become apparent that various modifications can be made without departing from the scope of the accompanying claims.

What is claimed is:

1. A shift assembly and mounting bracket assembly for mounting a conveyor to a mobile cart, the cart having tires for moving the cart in a fore and aft direction, the shift assembly comprising:
    an attachment bracket to mount the shift assembly to a support and forming a ground link;
    a parallel linkage movable having first and second parallel links each coupled at a first end to the attachment bracket; and
    a coupler connected to the other end of each of the first and second links whereby the coupler maintains a fixed attitude relative to the attachment bracket as the first and second links are moved; and
    a mounting bracket assembly connected to the coupler and adapted to mount a conveyor thereto;
    wherein the parallel linkage is limited to movement in a generally vertical plane in the fore and aft direction whereby the mounting bracket assembly is movable between a lowered position and a raised position.

2. The shift assembly of claim 1 wherein the parallel linkage is movable to move the mounting bracket assembly between at least two conveyor use positions.

3. The shift assembly of claim 1 further comprising a shift assembly linear actuator coupled to the attachment bracket and the parallel linkage to move the parallel linkage between positions.

4. The shift assembly of claim 1 further comprising a pivot between the parallel linkage and the mounting bracket assembly to rotate the mounting bracket assembly about a generally vertical axis.

5. A product cart comprising:
    a frame;
    one or more tanks forming a plurality of compartments each having an opening at the upper end thereof for receiving product into the compartments;
    a conveyor support having a swing arm with a first end pivotally mounted to the frame for motion generally horizontally between a storage position and a use position, a shift assembly mounted to a second end of the swing arm, a mounting bracket assembly coupled to the shift assembly and a conveyor coupled to the mounting bracket assembly; and
    wherein the shift assembly includes a parallel linkage having first and second parallel links and is operable to move the mounting bracket assembly between lowered and raised positions.

6. The product cart of claim 5 wherein the shift assembly is further operable to move the mounting bracket assembly between two or more conveyor use positions.

7. The product cart of claim 5 wherein the conveyor has a lower end with a hopper for receiving product and an upper end with a discharge spout for discharging product;
    wherein the shift assembly, in a first conveyor use position, places the discharge spout of the conveyor in a position to fill a first compartment and the shift assembly, in a second conveyor use position, places the discharge spout of the conveyor in a position to fill a second compartment.

8. The product cart of claim 7 wherein the shift assembly moves the mounting bracket assembly fore and aft when moving between the first and second conveyor use positions.

9. The product cart of claim 5 wherein the shift assembly includes a parallel linkage to maintain the mounting bracket assembly in a fixed orientation relative to a ground surface as the shift assembly moves between the first and second conveyor use positions.

10. The product cart of claim 5 wherein the shift assembly has a transport position in which the conveyor rests on one or more support brackets and a raised release position in which the conveyor is raised off the one or more support brackets.

11. The product cart of claim 10 wherein the shift assembly includes a parallel linkage to maintain the mounting bracket assembly in a fixed orientation relative to a ground surface as the shift assembly moves between the transport position and the raised release position whereby when the shift assembly moves between the transport and release positions the conveyor attitude remains constant.

* * * * *